(12) United States Patent
Monaghan et al.

(10) Patent No.: US 7,983,174 B1
(45) Date of Patent: Jul. 19, 2011

(54) METHOD AND APPARATUS FOR DIAGNOSING A FAULT IN A NETWORK PATH

(75) Inventors: John Monaghan, Dunbartonshire (GB); Thomas D. Nadeau, Hampton, NH (US); Sam K. Aldrin, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 961 days.

(21) Appl. No.: 11/313,283

(22) Filed: Dec. 19, 2005

(51) Int. Cl.
*G01R 31/08* (2006.01)
(52) U.S. Cl. .......................................... 370/242; 370/248
(58) Field of Classification Search .................. 370/216, 370/241–250, 351, 217; 714/25, 27, 43
See application file for complete search history.

(56) References Cited

U.S. PATENT DOCUMENTS

| | | | |
|---|---|---|---|
| 6,205,488 B1 | 3/2001 | Casey et al. | |
| 6,215,765 B1 | 4/2001 | McAllister et al. | |
| 6,222,824 B1 | 4/2001 | Marin et al. | |
| 6,337,861 B1 | 1/2002 | Rosen | |
| 6,396,810 B1 | 5/2002 | Hebel | |
| 6,459,682 B1 | 10/2002 | Ellesson et al. | |
| 6,477,522 B1 | 11/2002 | Young | |
| 6,662,223 B1 | 12/2003 | Zhang et al. | |
| 6,700,874 B1 | 3/2004 | Takihiro et al. | |
| 6,807,515 B2 | 10/2004 | Vogel et al. | |
| 6,813,240 B1 | 11/2004 | Shah | |
| 6,813,242 B1 | 11/2004 | Haskin et al. | |
| 6,891,795 B1 | 5/2005 | Hamachi et al. | |
| 6,963,927 B1 | 11/2005 | Lee et al. | |
| 6,965,577 B1 | 11/2005 | Murphy | |
| 7,076,559 B1 | 7/2006 | Ghanwani et al. | |
| 7,080,141 B1 | 7/2006 | Baekelmans et al. | |
| 7,120,118 B2 | 10/2006 | Rajagopal et al. | |
| 7,120,819 B1 * | 10/2006 | Gurer et al. ..................... | 714/4.2 |
| 7,139,278 B2 | 11/2006 | Gibson et al. | |
| 7,154,858 B1 | 12/2006 | Zhang et al. | |
| 7,280,486 B2 | 10/2007 | Suri | |
| 7,382,738 B2 | 6/2008 | Ravidran et al. | |
| 7,447,167 B2 | 11/2008 | Nadeau et al. | |
| 7,463,591 B1 | 12/2008 | Kompella et al. | |
| 7,466,655 B1 | 12/2008 | Zhao | |
| 7,471,679 B2 | 12/2008 | Lee | |

(Continued)

FOREIGN PATENT DOCUMENTS

CN 1472924 A 2/2004

(Continued)

OTHER PUBLICATIONS

Mark Lewis et al, Book: Troubleshooting Virtual Private Networks, May 2004, Cisco Press.*

(Continued)

*Primary Examiner* — Aung S Moe
*Assistant Examiner* — Vinncelas Louis
(74) *Attorney, Agent, or Firm* — Hickman Palermo Truong & Becker LLP

(57) ABSTRACT

A method of diagnosing a fault in a network path comprises the steps, performed at a diagnosing node, of initiating a path discovery test. The diagnosing node receives at least one path discovery test response and identifies the diagnosable node on the network path from a path discovery test response. The diagnosing node remotely accesses said diagnosable node and performs a diagnostic routine at said diagnosable node.

25 Claims, 14 Drawing Sheets

U.S. PATENT DOCUMENTS

| | | | |
|---|---|---|---|
| 2001/0029543 | A1 | 10/2001 | Iwata et al. |
| 2002/0093954 | A1 | 7/2002 | Weil et al. |
| 2002/0118636 | A1 | 8/2002 | Phelps et al. |
| 2003/0039212 | A1 | 2/2003 | Lloyd et al. |
| 2003/0043755 | A1 | 3/2003 | Mitchell |
| 2003/0048754 | A1 | 3/2003 | Bruckman |
| 2003/0048790 | A1 | 3/2003 | McAllister et al. |
| 2003/0055925 | A1 | 3/2003 | McAlinden |
| 2003/0058804 | A1 | 3/2003 | Saleh et al. |
| 2003/0076825 | A1 | 4/2003 | Guruprasad |
| 2003/0117962 | A1 | 6/2003 | Mattson et al. |
| 2003/0118036 | A1 | 6/2003 | Gibson et al. |
| 2003/0147346 | A1 | 8/2003 | Kanakubo |
| 2003/0149919 | A1* | 8/2003 | Greenwald et al. ............ 714/43 |
| 2003/0156543 | A1 | 8/2003 | Sahinoglu et al. |
| 2004/0081101 | A1 | 4/2004 | Bennett |
| 2004/0179471 | A1 | 9/2004 | Mekkittikul et al. |
| 2004/0190526 | A1 | 9/2004 | Kumar et al. |
| 2004/0193709 | A1 | 9/2004 | Selvaggi et al. |
| 2004/0199627 | A1 | 10/2004 | Frietsch |
| 2004/0210892 | A1 | 10/2004 | Sharma |
| 2004/0218542 | A1 | 11/2004 | Lee |
| 2004/0218595 | A1 | 11/2004 | Acharya et al. |
| 2004/0233859 | A1 | 11/2004 | Martin |
| 2005/0013259 | A1 | 1/2005 | Papoushado et al. |
| 2005/0018647 | A1* | 1/2005 | Lebrun et al. ................ 370/351 |
| 2005/0022189 | A1 | 1/2005 | Proulx et al. |
| 2005/0053005 | A1 | 3/2005 | Cain et al. |
| 2005/0083835 | A1 | 4/2005 | Prairie et al. |
| 2005/0207349 | A1 | 9/2005 | Nagami et al. |
| 2005/0281192 | A1* | 12/2005 | Nadeau et al. ................ 370/217 |
| 2006/0013142 | A1 | 1/2006 | Hongal et al. |
| 2006/0126495 | A1* | 6/2006 | Guichard et al. ............ 370/216 |
| 2006/0168208 | A1 | 7/2006 | Nagami |
| 2006/0182034 | A1 | 8/2006 | Klinker et al. |
| 2006/0182122 | A1 | 8/2006 | Davie et al. |
| 2006/0215577 | A1 | 9/2006 | Guichard et al. |
| 2006/0215579 | A1 | 9/2006 | Naudeau et al. |
| 2006/0262772 | A1 | 11/2006 | Guichard et al. |
| 2006/0268682 | A1 | 11/2006 | Vasseur |
| 2007/0025241 | A1 | 2/2007 | Naudeau et al. |
| 2007/0091897 | A1 | 4/2007 | Lee et al. |
| 2007/0214388 | A1* | 9/2007 | Auvenshine et al. ........... 714/27 |
| 2007/0280199 | A1 | 12/2007 | Rong |
| 2008/0056142 | A1 | 3/2008 | Arnold et al. |
| 2008/0080507 | A1 | 4/2008 | Swallow et al. |
| 2008/0095045 | A1 | 4/2008 | Owens et al. |
| 2008/0151746 | A1 | 6/2008 | Vasseur et al. |
| 2008/0205284 | A1 | 8/2008 | Azad |
| 2008/0304494 | A1 | 12/2008 | Yokoyama |
| 2009/0003223 | A1* | 1/2009 | McCallum et al. ............ 370/244 |
| 2009/0116396 | A1* | 5/2009 | Regan et al. ................ 370/248 |

FOREIGN PATENT DOCUMENTS

| | | |
|---|---|---|
| JP | 2005-269460 | 3/2004 |

OTHER PUBLICATIONS

Mark Lewis et al, Book Subtile: Troubleshooting Tools, May 2004, Cisco Press.*
Mark Lewis et al, Book Subtile: Troubleshooting MPLS VPNs, May 2004, Cisco Press.*
Mark Lewis et al, Book Subtile: Configuring MPLS VPNS, May 2004, Cisco Press.*
Mark Lewis et al, Book: OSI Model of chapter1 in Troubleshooting Virtual Private Networks, May 2004, Cisco Press.*
Mark Lewis et al, Book: Troubleshooting Any Transport over MPLS Based VPNs of chapter 7 in Troubleshooting Virtual Private Networks, May 2004, Cisco Press.*
MPLS OAM Tools for Troubleshooting MPLS Networks, Cisco, 2004.*
Anonymous, "Cisco IP Solution Center MPLS VPN Management 4.2," Cisco Systems, Inc., San Jose, California, 2006, pp. 1-6.
Anonymous, "MPLS VPN—VRF Selection Based on Source IP Address," Cisco Systems, Inc., San Jose, California, 2004, pp. 1-18.
Anonymous, "Cisco—How to Troubleshoot the MPLS VPN," Cisco Systems, Inc., San Jose, California, 2004, pp. 1-7.
K. Kompella et al., "Detecting MPLS Data Plane Failures," IETF Network Working Group Internet-Draft draft-ietf-mpls-lsp-ping-03.txt, Jun. 2003, pp. 1-23.
T. Nadeau et al., "OAM Requirements for MPLS Networks," IETF Network Working Group Internet-Draft draft-ietf-mpls-oam-requirements-02.txt, Jun. 2003, pp. 1-13.
T. Nadeau et al., "Pseudo Wire (PW) OAM Message Mapping," IETF Network Working Group Internet-Draft draft-ietf-pwe3-oam-msg-map-03.txt, Sep. 2005, pp. 1-20.
M. Aissaoui et al., "OAM Procedures for VPWS Interworking," IETF Network Working Group Internet-Draft draft-aissaoui-12vpn-vpws-iw-oam-04.txt, Sep. 2005, pp. 1-23.
T. Nadeau et al., "Pseudo Wire Virtual Circuit Connectivity Verification (VCCV)," IETF Network Working Group Internet-Draft draft-ietf-pwe3-vccv-08.txt, Mar. 2006, pp. 1-14.
D. Allan, et al., "A Framework for Multi-Protocol Label Switching (MPLS) Operations and Management (OAM)," IETF RFC 4378, Feb. 2006, pp. 1-11.
K. Kompella et al., "Detecting Multi-Protocol Label Switching (MPLS) Data Plane Failures," IETF RFC 4379, Feb. 2006, pp. 1-47.
S. Bryant et al., "Pseudowire Emulation Edge-to-Edge (PWE3) Control Word for Use over an MPLS PSN," IETF RFC 4385, Feb. 2006, pp. 1-12.
L. Martini et al., "Pseudowire Setup and Maintenance Using the Label Distribution Protocol (LDP)," IETF RFC 4447, Apr. 2006, pp. 1-31.
L. Martini et al., "Segmented Pseudo Wire," IETF Network Working Group Internet-Draft draft-ietf-pwe3-segmented-pw-02.txt, Mar. 2006, pp. 1-30.
D. Awduche et al., "Requirements for Traffic Engineering over MPLS," IETF RFC 2702, Sep. 1999, pp. 1-28.
E. Rosen et al., "Multiprotocol Label Switching Architecture," IETF RFC 3031, Jan. 2001, pp. 1-57.
Anonymous, "MPLS OAM Tools for Troubleshooting MPLS Networks," Cisco Systems, Inc., San Jose, California, 2004, pp. 1-44.
Anonymous, "Cisco Multiprotocol Label Switching Management Strategy," Cisco Systems, Inc., San Jose, California, 2004, pp. 1-8.
U.S. Appl. No. 11/313,283, filed Dec. 19, 2005, Monaghan et al.
U.S. Appl. No. 11/328,436, filed Jan. 9, 2006.
Kompella, Kiretti, Swallow, George, draft-ietf-mpls-lsp-ping-08-txt, left.org, dated Feb. 2005, pp. 1-43.
Cisco MPLS Diagnostic Expert, dated 2005, pp. 1-11, White Paper, Cisco Systems, Inc., San Jose, California.
China Office Action dated Aug. 1, 2008, Chinese Application No. 200680010074.7 (pp. 1-4).
China Office Action dated Nov. 28, 2008, Chinese Application No. 200680004044.5.
China Office Action dated Dec. 26, 2008, English Translation for Chinese Application No. 2006800004006.X (pp. 1-15).
China Office Action dated Mar. 20, 2009, Chinese Application No. 2006/80010074.7 (pp. 1-3).
PCT International Search Report (PCT Articles 18 and Rules 43 and 44) pp. 1-3.
International Search Report dated Aug. 7, 2007 (1 pg).
Stokes et al., Testing Hierarchical Virtual Private LAN Services, Jun. 2002 (pp. 1-25).
Welcher, P., BGP and MPLS-Based VPNs dated Oct. 4, 2000 (pp. 1-8) Chesapeake Netcraftsmen, www.netcraftsmen.net.
Brooks, A., Sacks, L., A Methodology for Monitoring LSP Availability in PLS Networks dated 2002 (pp. 1-4) University of London, www.ee.ucl.ac.uk.
Rosen, E., Rekhter, Y., RFC 4364—BGP/MPLS IP Virtual Private Networks (VPNs) dated Feb. 2006 (pp. 11-12, 26 & 24-26), The Internet Society.

* cited by examiner

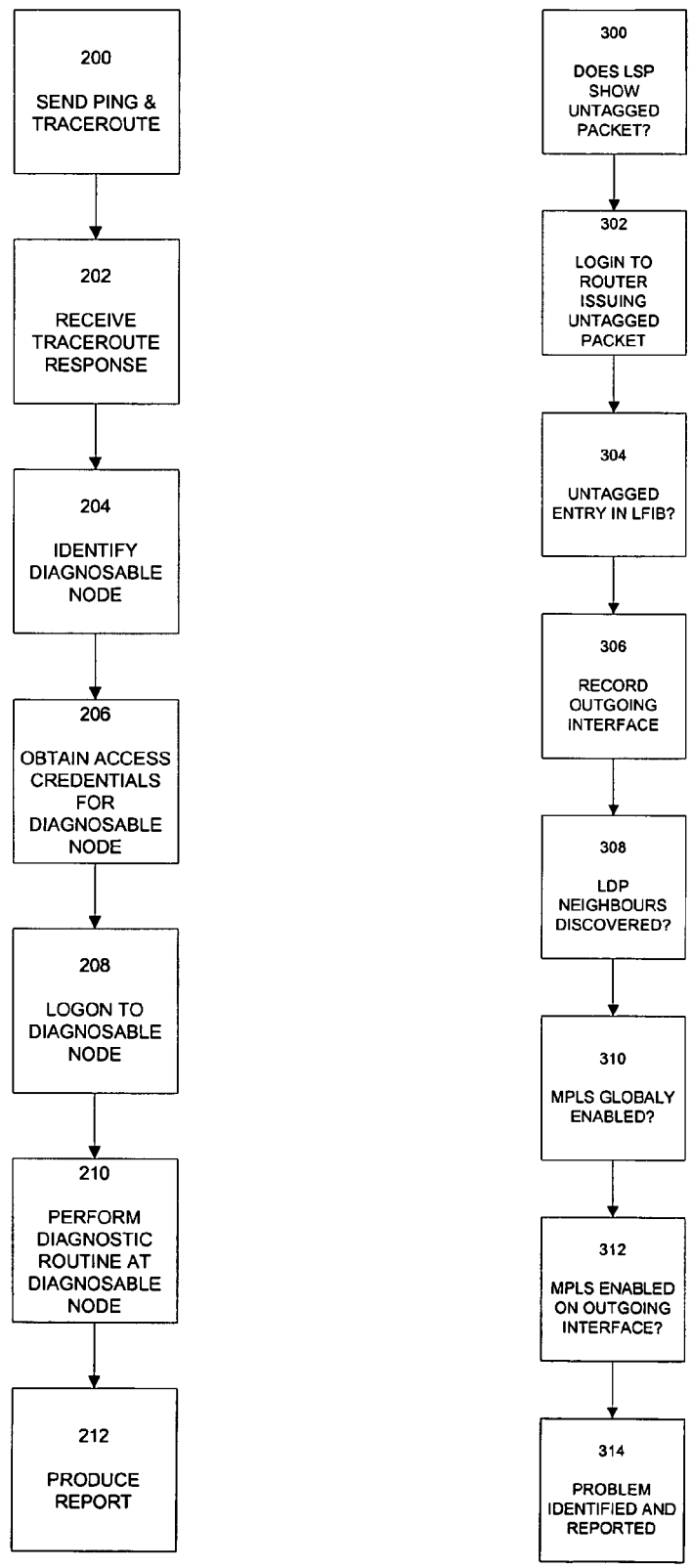

METHOD AND APPARATUS FOR DIAGNOSING A FAULT IN A NETWORK PATH

FIELD OF THE INVENTION

The present invention generally relates to network paths. The invention relates more specifically to a method and apparatus for diagnosing a fault in a network path.

BACKGROUND OF THE INVENTION

In computer networks such as the Internet, packets of data are sent from a source to a destination via a network of elements including links (communication paths such as telephone or optical lines) and nodes (for example, routers directing the packet along one or more of a plurality of links connected to it) according to one of various routing protocols.

One such protocol is MPLS (Multi Protocol Label Switching). MPLS is a protocol that is well known to the skilled reader and which is described in document "Multi Protocol Label Switching Architecture" which is available at the time of writing on the file "rfc3031.txt" in the directory "rfc" of the domain "ietf.org" on the World Wide Web. According to MPLS, a complete path for a source-destination pair is established, and values required for forwarding a packet between adjacent label switched routers (LSRs) in the path together with headers, or tags or "labels" are pre-pended to the packet. The labels are used to direct the packet to the correct interface and next hop. The labels precede the Internet Protocol (IP) or other header allowing smaller outer headers.

The path for the source-destination pair, termed a Label Switched Path (LSP) can be established according to various different approaches. One such approach is the Label Distribution Protocol (LDP) in which each router in the path invokes an LDP session with neighbouring LSRs and sends its label to the next hop router on the path as determined from its IP routing table. Alternative label distribution mechanisms include Resource Reservation Protocol (RSVP) in which case, for example, a network administrator can engineer a path, providing strict source routing and Border Gateway Protocol (BGP). In all cases a Label Forwarding Information Base (LFIB) stores both the next-hop information for the LSP, together with the label required by the next hop as a label binding.

For each LSP created, a forwarding equivalent class (FEC) is associated with the path specifying which packets are mapped to it.

At an ingress LSR to the LSP, packets destined, for example, for a certain destination or "prefix" are assigned to a corresponding FEC and injected into the LSP with the LSP next-hops ingress label pre-pended. The LSP next-hop router swaps its ingress label with an egress label received from its next-hop router and so forth. At an LSP egress router, the ingress label is removed and the packet is forwarded on towards the destination prefix according to the routing protocol supported thereafter.

One known use of MPLS is in MPLS virtual private networks (VPN) where an LSP is established between ingress and egress provider edge routers (PE) accessible by respective customer edge (CE) routers hence providing an effective tunnel between the customer edge routers.

MPLS VPN's are used for a range of telecommunications services but can give rise to difficulties in fault finding and troubleshooting. For example troubleshooting may be a manual task requiring complex procedures and hence costly skilled operators to find and diagnose faults. Both the isolation and identification of the cause of "broken" LSPs can hence lead to prolonged loss of connectivity for services using MPLS as a transport. Furthermore, problems tend to occur in ways that are not automatically detectable by the individual routers, such as misconfiguration or software/hardware defects such that customer intervention is required to draw the problem to the attention of the service provider.

Traditional fault management products focus on problem detection, alarm management and "trouble ticket" management. Problem detection is typically based upon receiving messages from network devices using simple network management protocol (SNMP) traps and logging messages, or polling the devices at regular intervals for predetermined fault symptoms. Alternatively test traffic can be injected into the network and problems detected in the form of an alarm. However other than generating a trouble ticket there is minimal support for subsequently diagnosing or troubleshooting the fault.

One known approach for detecting faults is described in "Detecting MPLS Data Plane Failures" of Kompella et al ("*Kompella*") which is available at the time of writing on the file "draft-ietf-mpls-lsp-ping-03.txt" in the directory "proceedings/03jul/I-D" of the domain "ietf.org" of the World Wide Web. According to the approach described therein, in a first detection step a "LSP ping" command is sent followed by an "LSP traceroute command". The LSP ping corresponds to an internet control message protocol (ICMP) ping comprising a packet sent along the path from the ingress point which is responded to from the egress point. Receipt of the response indicates that the path is healthy. LSP traceroute comprises a message which is received at each router along the LSP, passed along and responded to with additional diagnostic information. If there is a fault then the vicinity in which it occurred can be determined from identifying which furthest router sent a traceroute response. In addition the response itself may carry some low level diagnostic information. Accordingly the approach described in *Kompella* will tell a network administrator whether the path is healthy or broken and the general vicinity of any fault, but provides little more useful information.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram illustrating at a high level implementation of the method;

FIG. 3 is a flow diagram illustrating at a low level implementation of an aspect of the method;

DETAILED DESCRIPTION OF THE PREFERRED EMBODIMENT

A method and apparatus for diagnosing a fault in a network path is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
 1.0 General Overview
 2.0 Structural and Functional Overview
 3.0 Method of diagnosing a fault in a network path
 4.0 Implementation Mechanisms—Hardware Overview
 5.0 Extensions and Alternatives 1.0 General Overview The needs identified in the foregoing Background, and other needs and objects that will become apparent for the following description, are achieved in the present invention, which comprises, in one aspect, a method of diagnosing a fault in a network path comprising the steps, performed at the diagnosing node, of initiating a path discovery test, receiving at least one path discovery test response, identifying a diagnosable node on the network path from a path discovery test response remotely accessing said diagnosable node and performing a diagnostic routine at the diagnosable node.

In other aspects, the invention encompasses a computer apparatus and a computer-readable medium configured to carry out the foregoing steps.

2.0 Structural and Functional Overview

Figure 1:
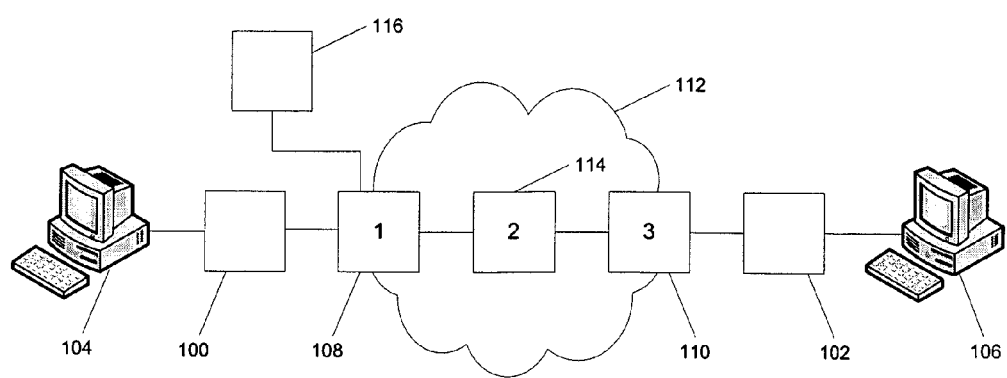
FIG. 1 is a representation of a network in relation to which the method described may be applied.

The method can be understood in overview with respect to FIG. 1 which is a diagram of a network in relation to which the method can be applied. It will be appreciated that the network diagram shown is highly simplified and that the method can be applied equally on any appropriate network having a network path, at any layer and any level of complexity.

The network comprises an MPLS VPN between first and second customer edge routers 100, 102 connected to respective customer devices 104, 106. Each customer edge device is connected to a respective provider edge devices 108 110. The provider edge devices 108, 110 communicate across an MPLS network designated generally 112 and in particular define a network path in the form of an LSP further including an intermediate LSR 114. In the embodiment shown the LSP progresses from the provider edge router acting as an ingress LSR1, 108 via intermediate LSR2, 114 to an egress LSR3, 110. Of course the connection between customer edges may be bi-directional as appropriate in which case a further LSP in the opposite direction is also set up.

In order to perform fault diagnosis of the LSP comprising LSR1, LSR2, LSR3, a network management application is resident on a network management system (NMS) 116 which is off line in the sense that it is not part of the network. Of course the NMS 116 can be located at any appropriate point on or without the network and can be a single or distributed entity or multiple independent but coordinated entities.

Accordingly, MPLS VPN traffic from user device 104 to 106 is forwarded first to customer edge router 100 and then on to provider edge router 108 where it is injected into the LSP defined by routers LSR 1, 2, 3. At LSR 3 the traffic leaves the LSP and is forwarded normally onto customer edge router 102 by provider edge router 110 and from there onto user device 106.

A method of diagnosing a fault in the LSP can be further understood with reference to FIG. 2, which is a flow diagram illustrating the steps performed at a diagnosing node such as management system or node 116. At step 200 the management system initiates a connectivity test such as a ping command for example provided by Path Verification Protocol (PVP) as set out in U.S. Ser. No. 11/072,082, U.S. Ser. No. 11/091,058, U.S. Ser. No. 11/086,007, U.S. Ser. No. 11/135, 253 and U.S. Ser. No. 11/001,149 of T. D. Nadeau et al, the entire contents of which are incorporated by reference for all purposes as though set forth herein. In addition Configurations herein employ principles operable in conjunction with those disclosed in copending patent application Ser. No. 11/361,299, filed Feb. 24, 2006, of Thomas D. Nadeau et al., entitled 'METHODS AND APPARATUS FOR PSEUDOWIRE PATH VERIFICATION', assigned to the assignee of the present application. The skilled person will be fully familiar with these functionalities such that detailed description is not required here. The test is initiated at the customer edge router or to the ingress node or LSR 1, 108, of the LSP. This functionality tests connectivity and can be initiated from any device in the local site subnet to a destination IP address in the remote site subnet but it an optimization tests that customer edge—customer edge connectivity is healthy. If access to the customer edge is not possible then an approximation of the test may be accepted. It will be noted that the functionality can be tested in both directions, that is, from the remote site customer or provider edge to the local site customer or provider edge (e.g., from LSR3 to LSR1, as well as vice versa). By testing connectivity in both stages, the troubleshooting and diagnostic functions can simulate an end-to-end test from the local site customer edge to the remote site customer edge and thus can identify any virtual route forwarding (VRF), connectivity problems between the sites, testing VPN, MPLS and IP connectivity between two sites. Of course the test can similarly be applied between any appropriate parts of the network, for example between provider edges, between an ingress customer edge and egress provider edge, and so forth.

Of course if the VPN connectivity is confirmed to be functional by successful ping tests, the MPLS provider can conclude that the problem may be the customer network. However if a VRF connectivity problem is detected, ie the ping or PVP message does not succeed, then a path discovery test which can be any appropriate path discovery technique such as PVP path trace providing LSP traceroute is initiated. The path discovery command ensures that the vicinity of the problem can be identified. In particular, at step 202 the network management system receives a path discovery response. In the case of current traceroute functionality this will either identify the last healthy router in the LSP, further downstream routers failing to respond at all, or will return an unhealthy traceroute response from a router. It will be noted that according to an alternative approach, an image of the network may be constructed at the network management system carrying relevant information such as a forwarding table images, IP address and identifier and access credentials and which is pre-constructed according to known techniques which will be familiar to the skilled reader and are not described in detail here. In that case the path discovery steps can be carried on the image of the network rather than the network itself. In either case, initiation of the path discovery test and the subsequent diagnostic router are fully automated.

At step 204 the network management system identifies from the received path discovery command or traceroute responses a diagnosable node comprising either the last healthy node or the node in the LSP returning an unhealthy traceroute response. It will be noted that in practice the traceroute response may carry only the node's IP address. However the network management system can identify the actual node identity using any appropriate identifier for example from information carried on the network image which automatically maps the IP address to the diagnosable node identifier.

At step 206 the network management system obtains from the network image the access credentials for the diagnosable node. For example any passwords required to log on to the node are obtained. At step 208 the network management system then remotely access the diagnosable node for example automatically logging on using the access credentials obtained from the network image. This remote access or log on step is carried out using any appropriate approach and effectively comprises remote accessing of the operating system or command line interface (CLI) of the diagnosable node, for example using management protocols such as simple network management protocol SNMP or proprietary APIs implemented in XML over some other transport such as HTTP. The management traffic for remote access can be sent "in-band" for example over an LSP or "out-of band" for example over an alternate, logical or hard-wired path such as a serial/terminal server, and in any appropriate form including encrypted form.

At step 210 a diagnostic routine is performed at the diagnostic node, controlled or initiated remotely from the network management system. In particular, as described in more detail below, a sequence of automated troubleshooting and diagnostic steps is performed to diagnose the cause of the fault and depending on the nature and location of the fault. For example basic per-node configuration may be checked, validation of LDP operation may be checked and route installation into the MPLS forwarding table may be checked, together with configuration mismatch errors. As also described in more detail below, forwarding information and other relevant information on the diagnosable node may also be used to identify, log out and carry out corresponding diagnostic routines on its downstream next-hop node in the LSP if it is detected that the fault may in fact lie on the next node which may not have been visible in the traceroute.

At step 212, having isolated and diagnosed the fault, a report is produced automatically for example at a graphical user interface (GUI) or on hard copy at the network management system remotely identifying the diagnosed fault. The report may either present a conclusion as to the nature of the fault and recommended actions to take in response, or an "observation" identifying important characteristics of the path and nodes on the path that have been identified during the diagnosis, for example, Observation 1: traceroute has revealed packet is unlabeled. Observation 2: LDP session not established between peer LSRs, Observation 3: ACL present on interface on path in the case that the fault cannot be identified, allowing the administrator to make an educated decision as to the nature of the actual fault. In addition a test log is produced by the system running providing an audit trail of the steps taken which again can be used by the administrator to assess what further steps need to be taken. Appropriate alarms or alerts can also be generated for example physically or on screen. The LSP can be rendered graphically between the end points on the GUI including network element names, port and interface names as well as label swapping along the path, for example based on the output of PVP ping or path trace.

Accordingly it can be seen that the approach carries out three effective stages. A first validation stage uses LSP ping to validate that the LSP under test is broken, which can be initiated manually or at pre-determined intervals which may be dynamically self-adjusted, or in response to pre-determined events, but can be implemented automatically in software. In a second, isolation step, if the LSP is broken, the use of LSP traceroute and the network image where required to translate an IP address allows identification of candidate routers or nodes that may be causing the problem and which can be automatically issued upon failure of the LSP ping. In a diagnosis step, the system logs into the candidate device or downstream nodes thereafter if necessary and identifies faults such as misconfigurations of MPLS.

Implementation of the method will be described in more detail below, but one possible implementation is described with reference to FIG. 3 which is a flow diagram illustrating the steps carried out in the event that MPLS has been disabled on an interface. At step 300 the network management system identifies whether the LSP traceroute shows an untagged (unlabelled) packet, that is, a packet which does not possess MPLS encapsulation header. In that case, at step 302, the unhealthy node issuing the untagged packet is logged into. At step 304 the network management system checks whether an untagged entry exists in the LFIB for the prefix being tested. At step 306, for any such entry the outgoing interface for the prefix in the LFIB is recorded. At step 308 the network management system checks whether the LDP neighbours have been discovered via the outgoing interface. If not then a check is carried out to establish whether MPLS is globally enabled. At step 310 if MPLS is globally enabled then at step 312 a check is carried out to establish whether it is established on the outgoing interface at step 312. If not, then at step 314, the problem can be identified accordingly that MPLS is not enabled on the relevant interface and this can be provided in a report. Of course, and as described in more detail below, other faults are detectable, for example identification of a packet carrying an incorrect header.

It will be noted that all of the steps in FIG. 3 can be automated in software and of course that at any point in the algorithm shown, if a problem is identified at that step then the algorithm can stop and the report can be generated appropriately. The report can identify the nature of the problem, its exact cause and location and, as appropriate, a recommendation of how to repair taken from an appropriate database of possible approaches.

As described in more detail below, the approach described above can be applied for detection of any kind of network path fault such as an LSP problem for example found in an MPLS VPN. This includes network outages caused by operator configuration, failure of LDP not arising from underlying IP forwarding, route installation problems into VRF tables, LSP "black holes" into which packets are being dropped, failure on the LSP return path, failure to start LDP sessions, failure to label packets or label allocation problems, route target mismatches or chip failure on a router line card (LC).

In addition the approach allows visualization of MPLS LSPs that represent specific packet flows across the MPLS network.

The method is easy to install, simple to operate and can release technical resources by reducing diagnostic time.

Hence operation expenses and mean time to repair can reduced by performing fast diagnostics based on analysis of network failures in the access, edge and core parts of MPLS networks ranging from simple configuration problems to complex scenarios such as mismatch in a distributed system between route processor (RP) and LC LFIB using device command—line interaction decision points. In addition the system can be used to check connectivity across LSPs such as VPNs before and after configuration changes, whenever significant changes are planned in a network.

DETAILED DESCRIPTION OF THE INVENTION

The invention can further be understood with reference to the flow diagrams of FIGS. 4 to 12 which illustrate method steps carried out in the various validation, isolation and diagnosis routines according to the method described herein.

Figure 4A:
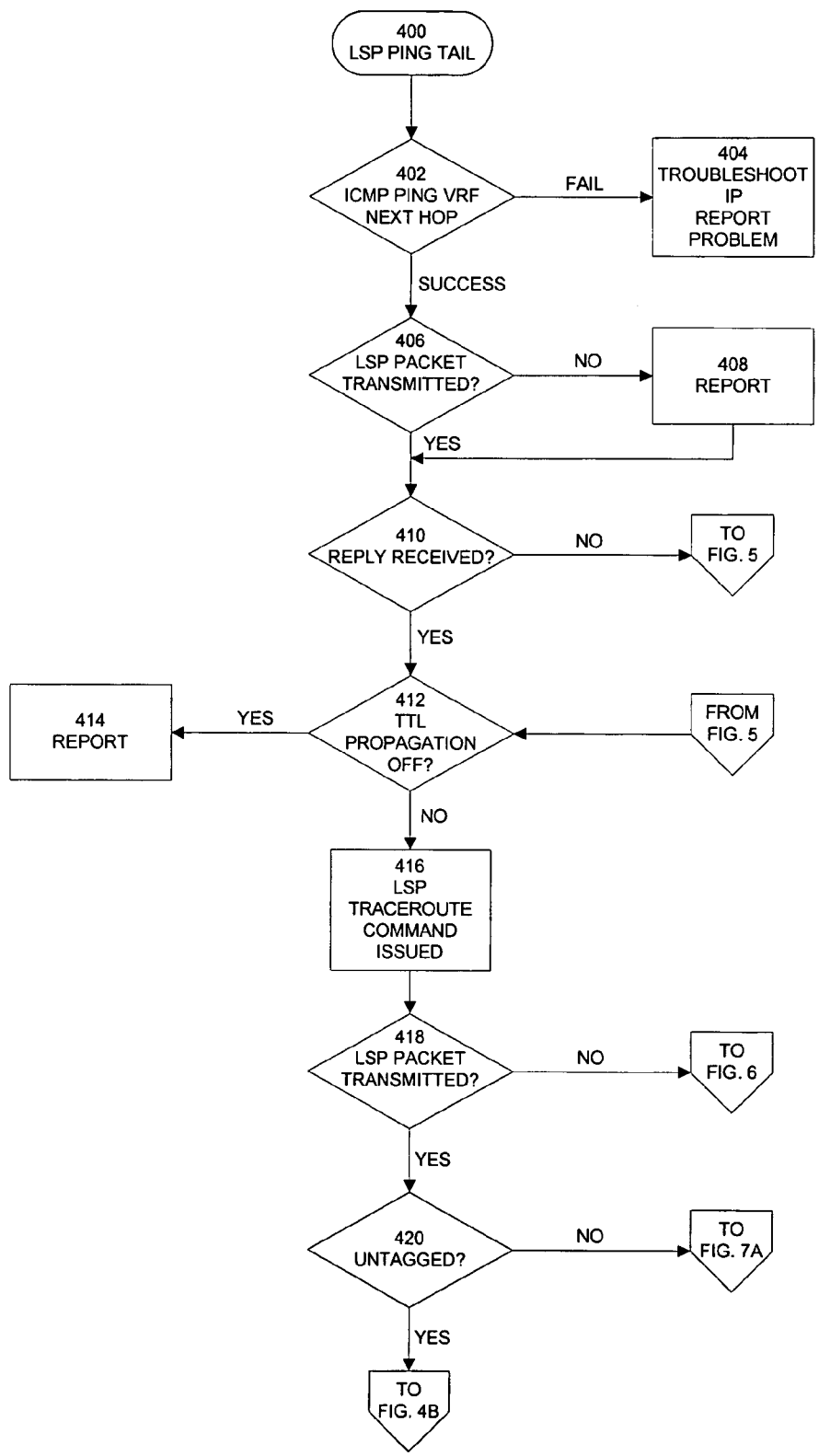
FIG. 4A is a flow diagram illustrating at a low level implementation of an aspect of the method.
Figure 4B:
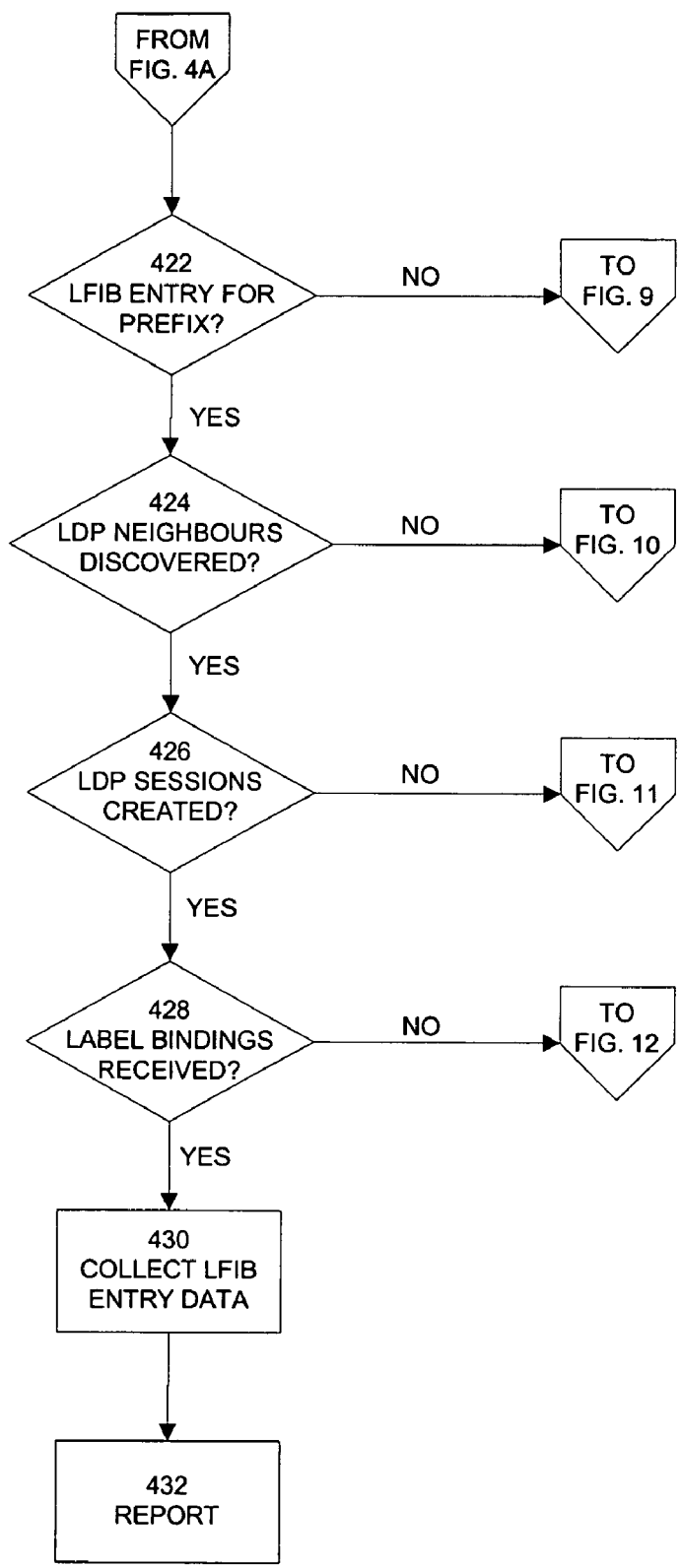
FIG. 4B is a confirmation of FIG. 4A.

FIGS. 4A and 4B show the core steps performed. At step 400 an LSP ping failure is detected indicating that there is a problem with MPLS connectivity. It will be noted that the ping fail will cover the eventuality that there are equal cost multi-path (ECMP) scenarios as well where there are equal cost LSP's. At step 402 IP connectivity, required for an LSP to be established, is checked with a an ICMP ping for VRF next-hop. If this fails then at step 404 a report message is produced indicating an IP problem requiring trouble shooting although optionally appropriate IP diagnostic steps can be implemented.

If the ICMP ping succeeds then at step 406 a check is carried out to establish whether an LSP packet was transmitted. This check is carried out at the LSP ingress node, LSR1, 108, in the network of FIG. 1. If not then at step 408 this fact is logged for subsequent display as an observation which will convey additional relevant information to the administrator and then the route is rejoined at step 410 where a check is established to see whether a reply was received.

Figure 5:
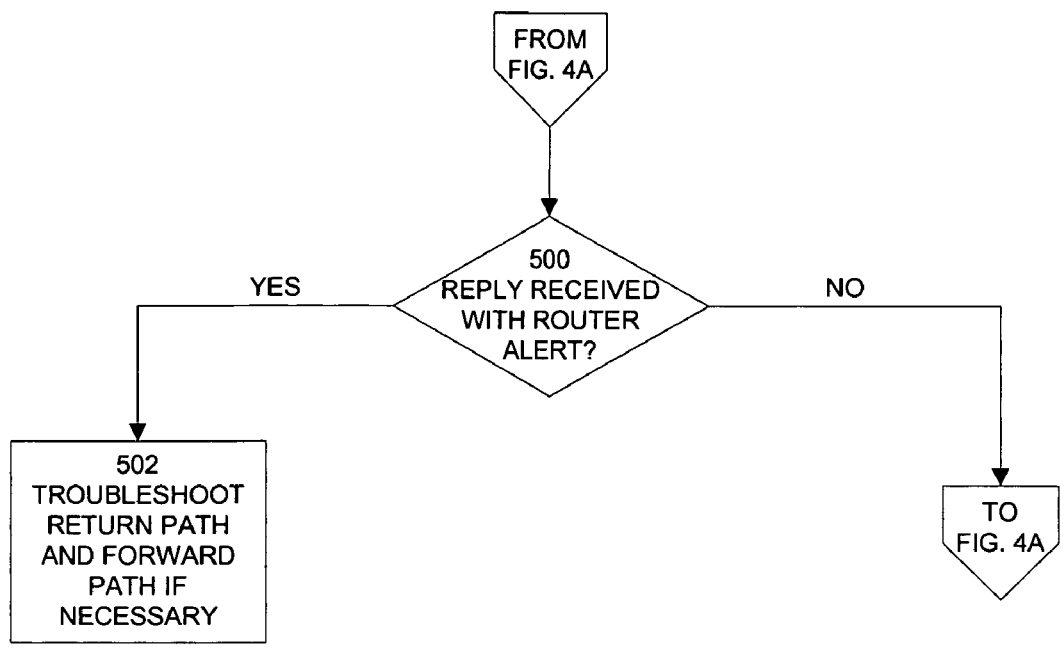
FIG. 5 is a flow diagram illustrating at a low level implementation of an aspect of the method.
Figure 6:
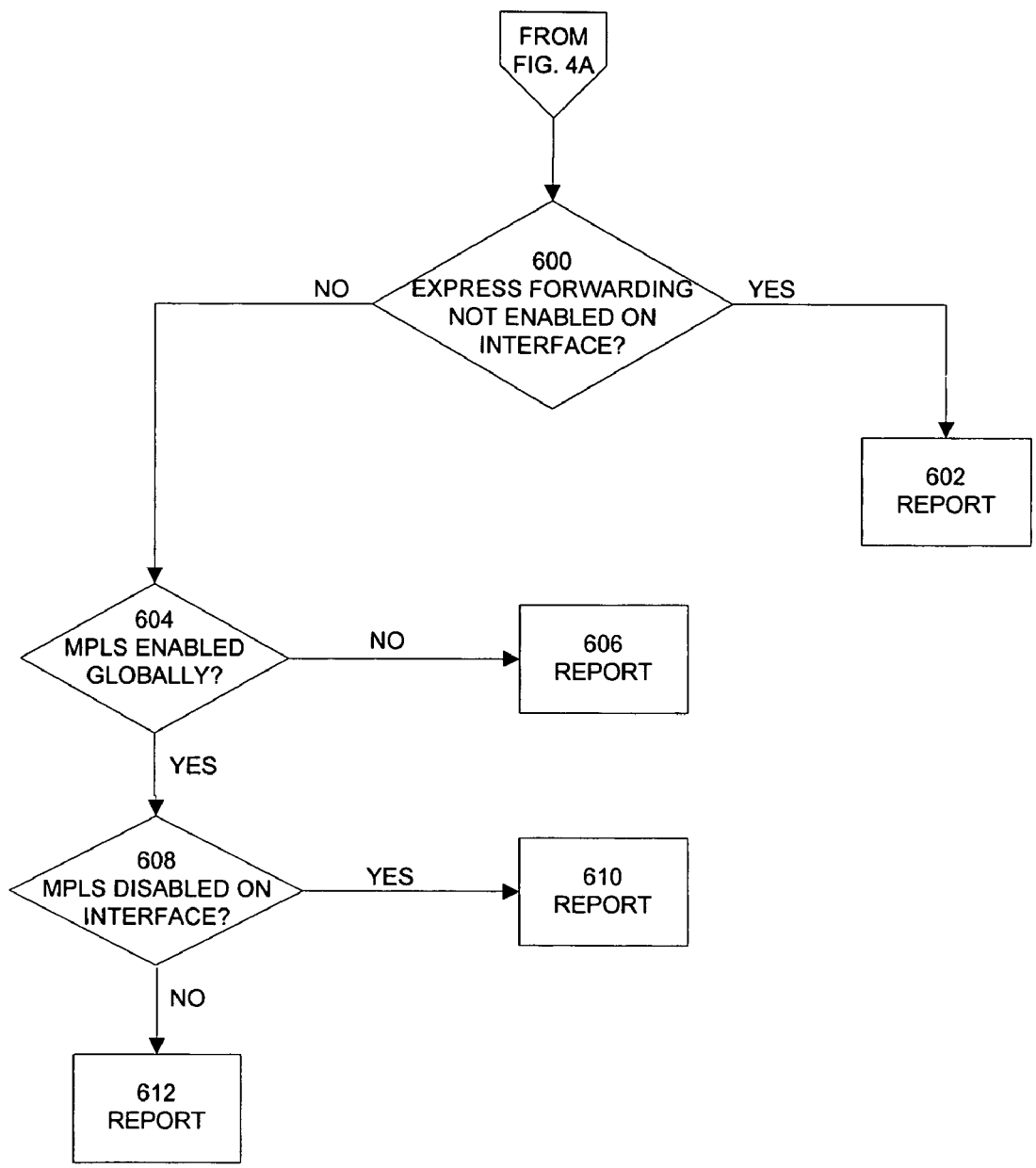
FIG. 6 is a flow diagram illustrating at a low level implementation of an aspect of the method.

The steps carried out if a reply was received are shown in FIG. 5. At step 500 the LSP packet is re-sent with a "router alert" flag which will be well known to the skilled reader. If a reply is received to the flagged packed then at step 502 this indicates that either the forward or return path LSP is broken and appropriate diagnostics and troubleshooting can be carried out in relation to the forward path and the return path if necessary and an appropriate report is generated. It will be noted that the return path can be analysed using the approach described above but wherein the network management system starts the steps at the egress router to the forward path, LSR3 from FIG. 1.

If a reply is not received in response to the flagged router alert then the process returns to the flow shown in FIG. 4A at step 412. Similarly if a reply was received at step 410 the flow progresses to step 412. At step 412 an optional check is carried out dependent on the specific LSP traceroute functionality to establish whether MPLS time to live (TTL) is propagated to the IP header when it exist the MPLS domain. In that case in some instances LSP traceroute functionality does not provide useful information and if so a corresponding report is generated at step 414 otherwise, however, at step 416 it is identified that LSP traceroute will operate correctly and an LSP traceroute command is issued.

At step 418 a check is carried out to establish whether the LSP packet is transmitted. If not then the flow progresses to the branch shown at FIG. 6. In particular, once again depending on the specific operating systems, a check is carried out at step 600 to establish whether express forwarding (for example Cisco Express Forwarding (CEF which is a trade mark of and available from Cisco Systems, Inc of San Jose Calif., and which is well known to the skilled reader and not described in detail here) is not enabled on the interface. In the case of a yes finding, that is that express forwarding is not enabled, then a report is generated at step 602. However if express forwarding is enabled then at step 604 a check is carried out to establish whether MPLS is enabled globally and if not a report is generated at step 606. If MPLS is enabled globally then at step 608 a check is carried out to establish whether MPLS is disabled on the interface and if so a report is generated at step 610. If not then a report is generated at step 612 which may be in the form of an observation identifying the checks that have been carried out but indicating that the fault cannot be identified.

At step 420 a check is carried out to establish whether a transmitted packet was untagged. If an untagged packet is not detected at step 420 this indicates that the initial diagnosable node is in fact functioning correctly as it is sending packets with labels and so the flow proceeds to FIG. 7A. At step 650 it is checked whether there is an LFIB entry for the prefix. If not then at step 652 a corresponding report is generated. If there is an LFIB entry for the prefix then at step 654 the system proceeds to identify the next-hop router in the LSP. In particular as it is known that the current diagnosable node is correctly forwarding tagged packets then the network management system automatically recognizes that the fault may lie at the next-hop and identifies the next-hop automatically, by obtaining the next-hop LDP LSR is obtained from the forwarding information on the current diagnosable node. For example in the topology shown in FIG. 1, where LSR2 returned the traceroute then the next-hop is identified as LSR3 which is then treated as the diagnosable node.

At step 656 the received label from LDP from the next-hop is determined and at step 658 any sent packet discrepancy is identified, that is to say it is identified whether router LSR2 is sending the wrong label to router LSR3. If so then at step 660, depending on the operating system adopted, it is assessed whether there is a distributed platform. For example for a routing table may be held at the routing processor (RP) and the forwarding table at the line card (LC) in which case there may be a software state difference. If there is a distributed platform, therefore, it is checked at step 662 whether the LC LFIB is corrupt and if so a report is generated at step 664. If however there is no distributed platform or the LC LFIB on a distributed platform is not corrupt then at step 666 a corresponding report is generated once again indicating that there is a sent packet discrepancy not originating from a distributed platform.

If there is no sent packet discrepancy then at step 668 a check is carried out to establish whether the diagnosable node is the ingress point, ie router LSR1. In that case the flow proceeds to the steps set out in FIG. 7b. If the diagnosable node is not the ingress point, for example node LSR2, then at step 670 a received packet discrepancy check is carried out and if such a discrepancy is identified then this is reported at step 672. It will be seen that this step is not carried out if the node is the ingress point as there will be no received packet.

Figure 7A:
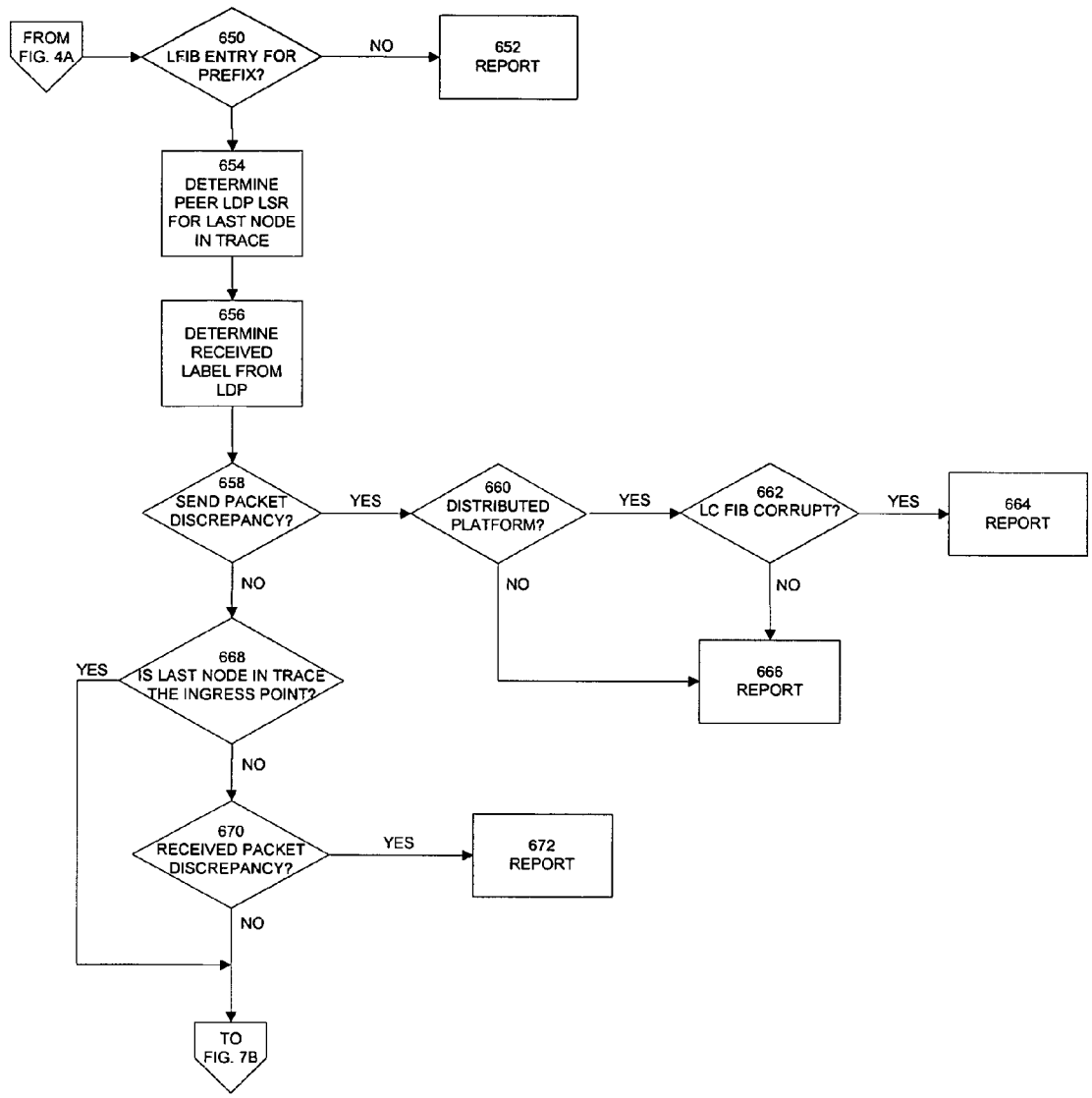
FIG. 7A is a flow diagram illustrating at a low level implementation of an aspect of the method.
Figure 7B:
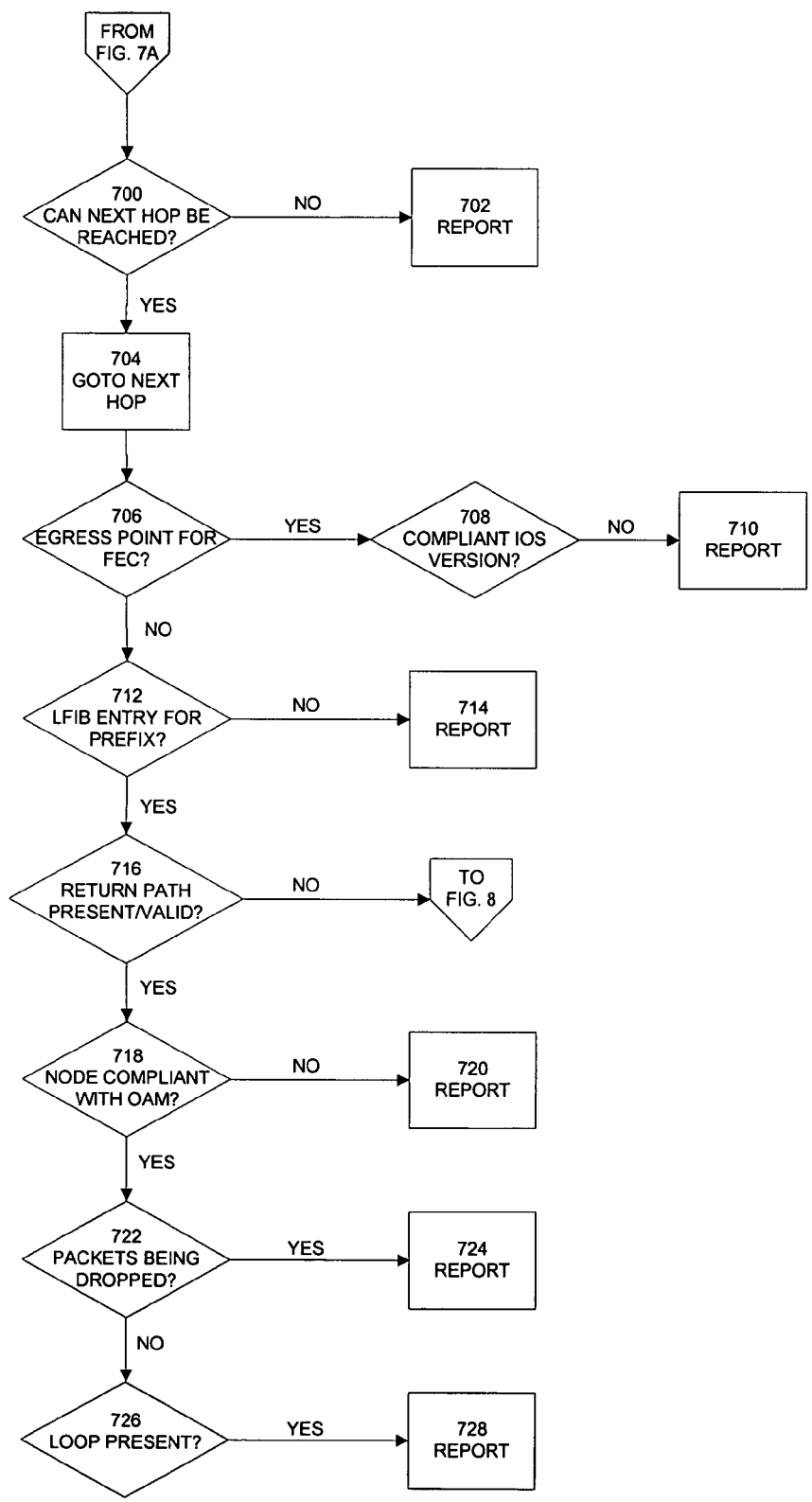
FIG. 7B is a continuation of FIG. 7A.

If there is no received packet discrepancy then the flow proceeds to the steps set out in FIG. 7B.

Referring to FIG. 7B, at step 700 it is checked whether or not the next-hop can be reached. If not then an unknown error report is generated at 702. However as discussed above, a test log can be provided at the same time indicating what steps have been taken which will allow the administrator to identify the error more quickly.

If the next-hop can be reached then at step 704 the network management system logs onto the next-hop router, namely router 3 in the topology of FIG. 1.

At step 706 an initial step is carried out to identify whether the next-hop router which has now been logged on to comprises the egress point for the FEC/LSP. For example if router LSR3 is indeed the egress point then at step 708 a check is carried out to establish whether the router implements a compliant internet operating system (IOS) version. If not this indicates that the egress router does not support LSP ping and LSP traceroute and a corresponding report is generated at step 710. In an alternative topology where, for example, there is an additional next-hop router between router LSR 2 and router LSR 3 then this is not the egress point for the FEC and so it is not relevant to establish the compliance of the IOS as it will nonetheless be forwarding ping and traceroute along the path as normal traffic. In that case, step 712 it is checked whether there is an LFIB entry for the prefix. If not then at step 714 a corresponding report is generated. If there is an LFIB entry for the prefix then at step 716 a check is carried out to establish whether a return path is present and valid. For example this can be done by examining the LFIB on the next-hop router in relation to forwarding to the upstream router.

Figure 8:
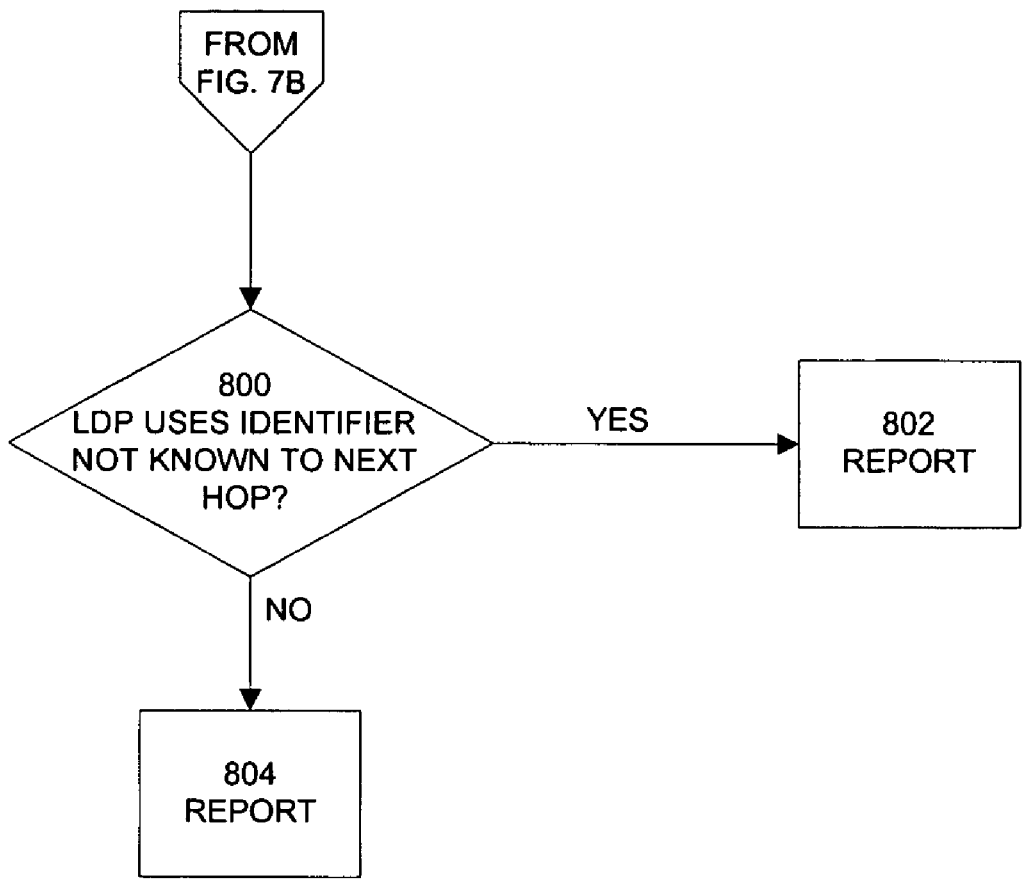
FIG. 8 is a flow diagram illustrating at a low level implementation of an aspect of the method.

If there is no such path then the process proceeds to the flow shown in FIG. 8. At step 800 a check is carried out to establish whether at the source of the path, LDP has used an identifier not known to the remainder of the path and if so a corresponding error message is generated indicating an LSP connectivity problem which is reported appropriately at step 802. Otherwise at step 804 an LSP connectivity problem is indicated stating that the diagnosable node has no reply path back to the source of the path (reason unknown).

Reverting to FIG. 7B, if the return path is present and valid then at step 718 it is checked whether the next-hop node is compliant with the operation administration and management (OAM) criteria and if not a corresponding report is generated at step 720 stating that there is an MPLS connectivity problem but the path could not be fully diagnosed due to the presence of a node that does not support the OAM protocols (e.g. lsp ping/trace) on the path. Any observations will be displayed, e.g. that the previous node had an LDP failure At step 720, if the next-hop node is compliant with the OAM criteria then a further check is carried out to establish where the packets are being dropped at the node. This can be done using any appropriate known command at the node as managed by the network management system. If packets are being dropped then an appropriate report is generated at step 722 indicating that packets are being dropped for an unknown reason. Once again together with a test log this provides detailed information allowing the actual fault to be diagnosed very quickly. Finally, if at step 726 a loop is detected using any appropriate detection mechanism such as test packets, then at step 728 once again a corresponding report is generated indicating the presence of a routing loop and suggesting appropriate troubleshooting steps in response.

Reverting to FIG. 4A, if the originally diagnosed node is sending untagged packets at step 420 then the flow proceeds to FIG. 4B. In this case the network management system continues to diagnose the node which returned the traceroute response rather than the next-hop node as diagnosable node. At step 422 it is checked whether there is an LFIB entry for the prefix. If not then the flow proceeds to FIG. 9.

Figure 9:
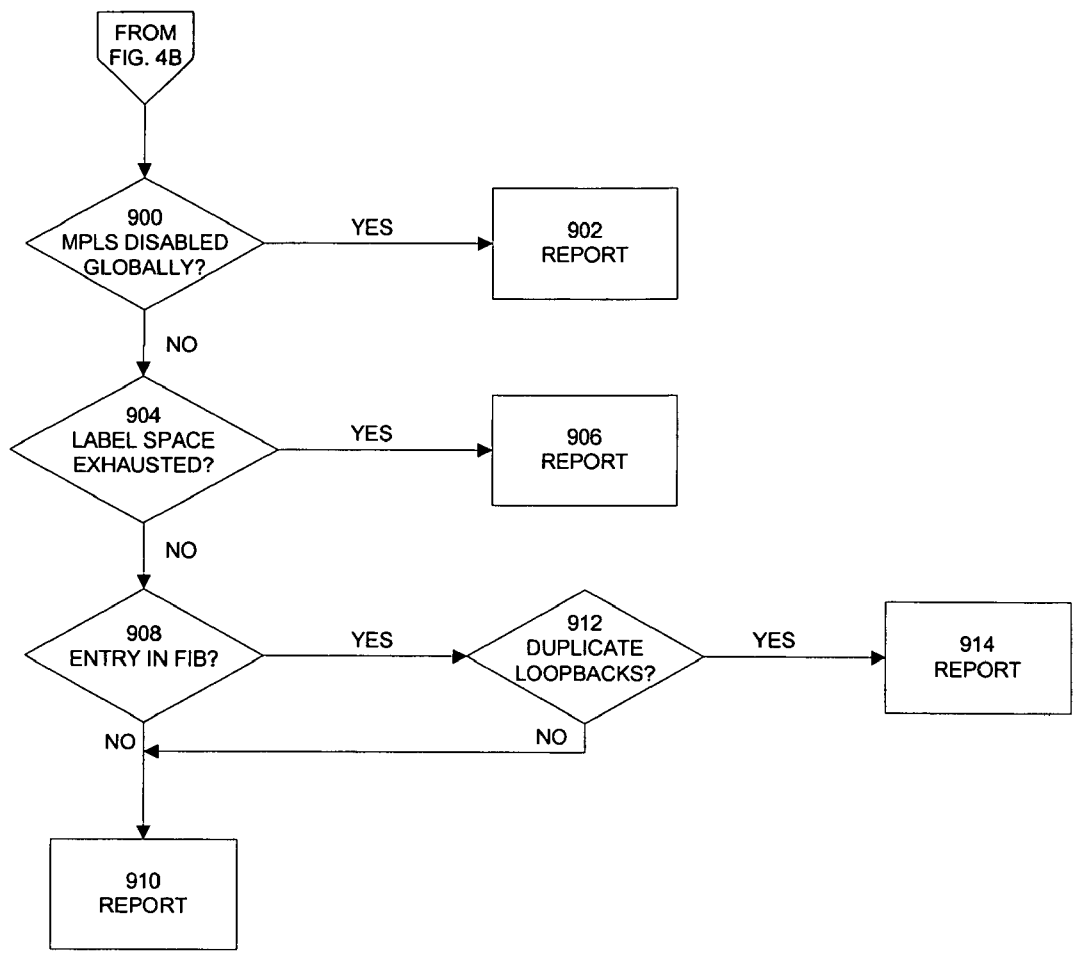
FIG. 9 is a flow diagram illustrating at a low level implementation of an aspect of the method.
Figure 10:
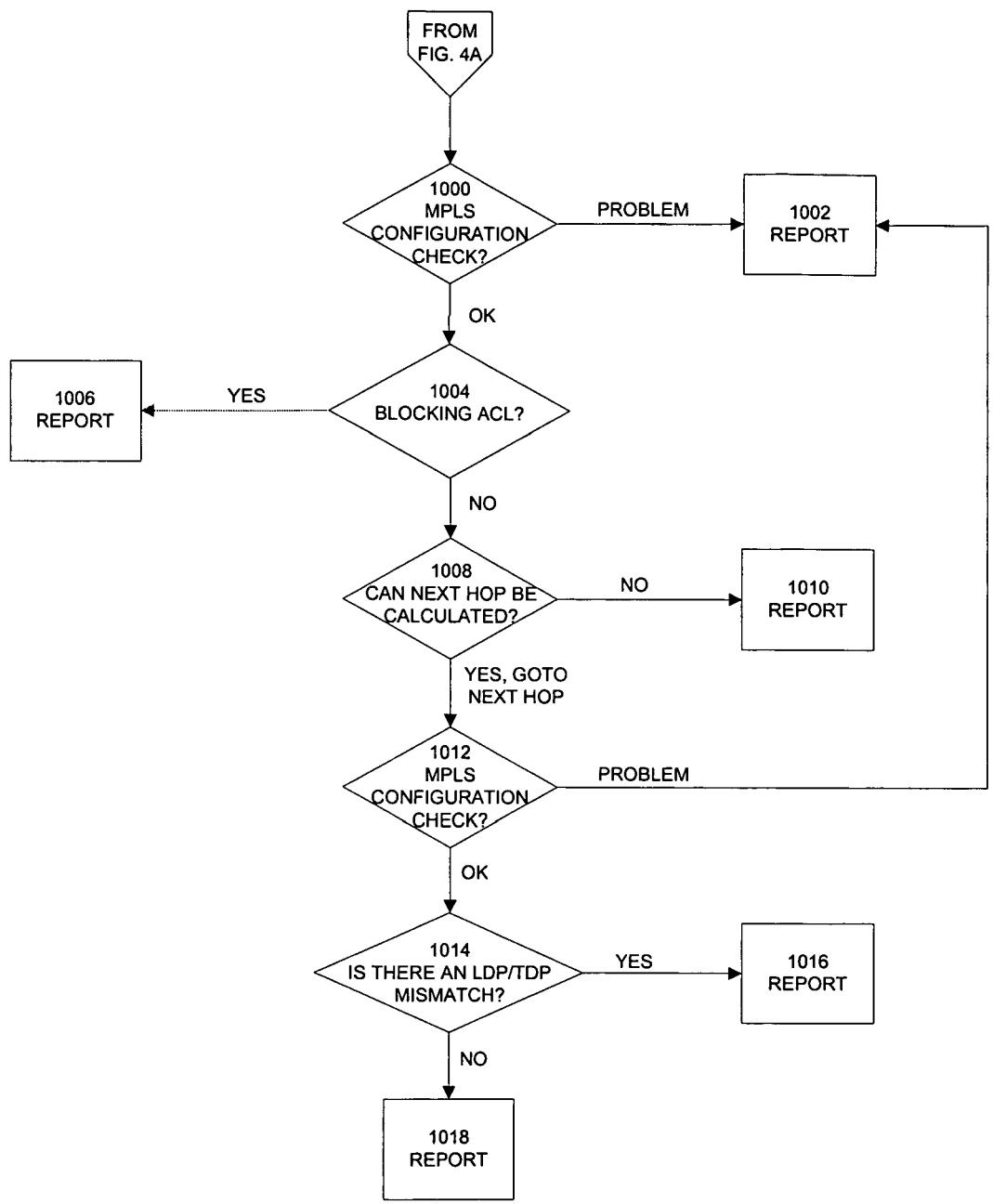
FIG. 10 is a flow diagram illustrating at a low level implementation of an aspect of the method.
Figure 11:
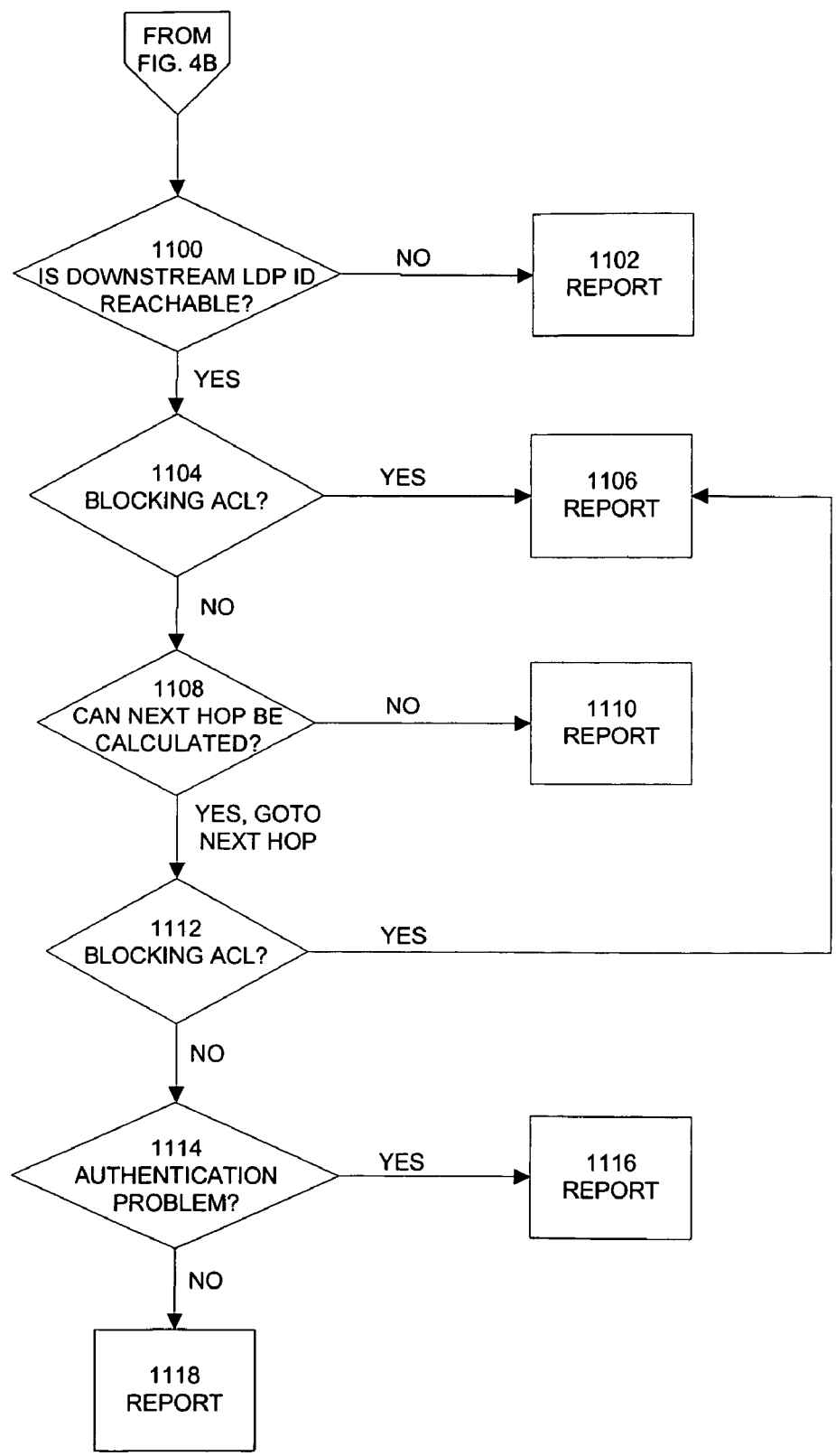
FIG. 11 is a flow diagram illustrating at a low level implementation of an aspect of the method.
Figure 12:
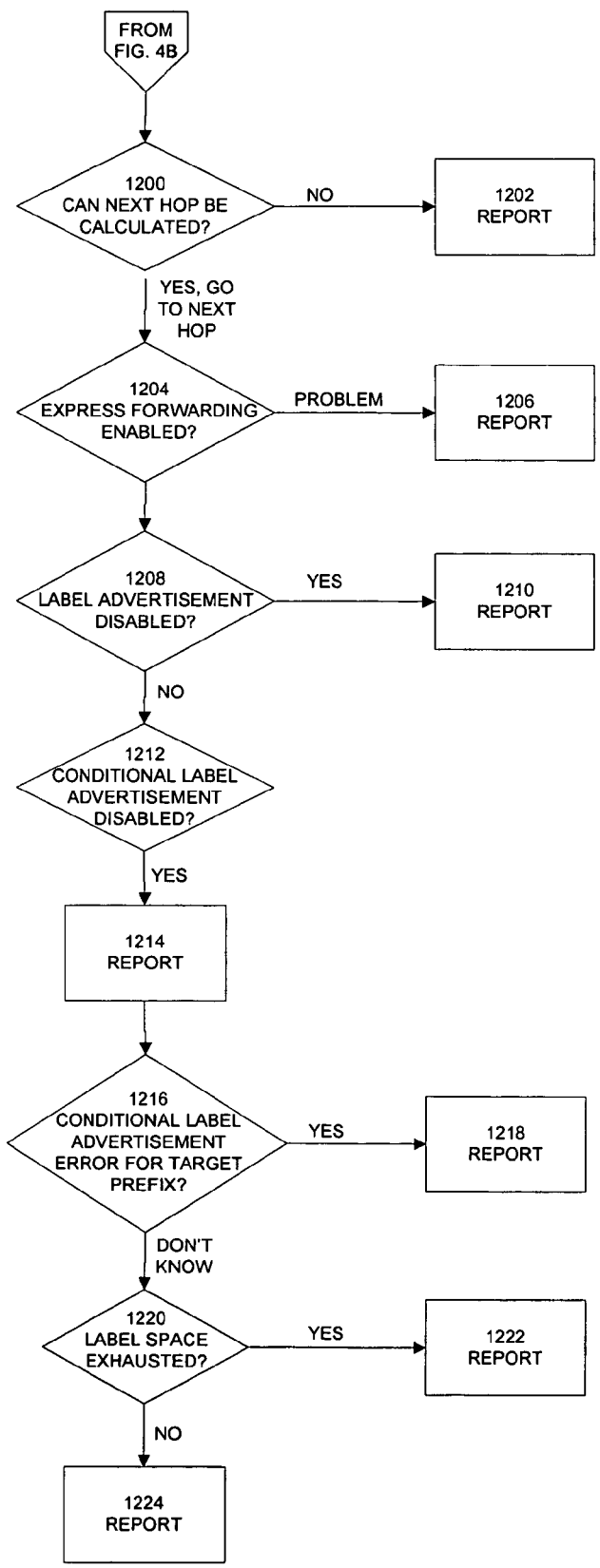
FIG. 12 is a flow diagram illustrating at a low level implementation of an aspect of the method.

Referring then to FIG. 9 a first check is carried out at step 900 to establish whether MPLS has been globally disabled and if so a report is generated at step 902. Otherwise at step 904 a check is carried out to establish whether there is a failure in the control plane, for example in the label distribution mechanism. For example it may be checked whether the label space is exhausted, that is to say, the store of available labels at the node has run out. If so a report is generated at step 906.

If not at step 908 it is checked whether there is an entry in the FIB, that is, the LP forwarding information base on which the LFIB is built. If not then a report is generated at step 910 but otherwise, at step 912 a check is carried out for duplicate loopbacks. If there are no duplicate loop backs then the error report at 910 is repeated indicating that there is no entry in the FIB but otherwise at step 914 a duplicate loop back for report is generated.

Reverting to FIG. 4B, if there is an LFIB entry for the prefix then at step 424 a check is carried out to establish whether the LDP allow session has appropriately taken place. Accordingly a check is established for whether LDP neighbours have been discovered. If not then a report is generated and the flow proceeds to the steps set out in FIG. 10. As a first possible cause of this failure in the LDP session an MPLS configuration check is carried out at step 1000 which can be any appropriate MPLS configuration check and which will give rise to the appropriate problem report at step 1002. If the MPLS configuration check is satisfactory then at step 1004 a check is carried out to establish whether there is an access control list (ACL) or other filter which is blocking the session in which case a corresponding report is generated at step 1006. If there is no blocking ACL then at step 1008 it is established whether the next-hop can be calculated. If not then a report is generated at step 1010 in the form of an observation indicating the steps that have been taken and that an unknown error has occurred.

If the next-hop can be calculated then the network management system proceeds to log on to the identified next-hop and carries out an MPLS configuration check at step 1012 corresponding to that described above with reference to step 1000 and giving rise to any problem reports at step 1002. If there are no problems then at step 1014 an LDP mismatch is checked and if one is present then a report is generated at step 1016. Otherwise at step 1018 a report is once again generated in the form of an observation that the cause is not known but indicating the steps that have been carried out.

Reverting to FIG. 4B, if LDP neighbours can be discovered then it is next checked whether an LDP session has in fact been created at step 426 and in particular whether labels have been exchanged. If not then the flow proceeds to the steps set out in FIG. 11. At step 1100 a check is carried out to establish whether the downstream LDP router is reachable. In particular it is checked to establish whether it can be reached by IF as the protocol underlying the LDP session. If not a report is generated at step 1102. If it is reachable then at step 1104 once again a blocking ACL is checked for and if one is detected then a corresponding message is reported at step 1106. If there is no blocking ACL then the next-hop is calculated at step 1108 and an error message is reported at step 1110 if the next-hop cannot be calculated. If the next-hop can be calculated then the network management system logs onto that router and once again a check is carried out at step 1112 for blocking ACL and a report generated if one is detected at step 1106. Otherwise a check is carried out as to whether there is an authentication problem, that is to say, whether there is any other software or filter in place which does not authenticate transactions between the two routers and if such a problem is detected then a report is generated at step 1116. Otherwise a report is generated at step 1118 as an observation indicating what steps have been carried out.

Reverting to FIG. 4B, if LDP sessions have been created then at step 428 a check is carried out to establish whether label bindings have been received. If not then the process proceeds to the steps set out in FIG. 12. At step 1200, if a next-hop cannot be calculated then at step 1202 a report is generated accordingly. Otherwise the network management system logs into the next-hop and at step 1204 carries out an optional platform-specific check to establish whether express forwarding is enabled. If not then at step 1206 then the problem is reported. Otherwise, at step 1208 a first check why as to why labels have not been received is carried out and in particular it is established whether label advertisement has been disabled. If so then at step 1210 a corresponding report is generated. Otherwise at step 1212 a check is carried out to establish whether conditional label advertisement is enabled and if so a report is generated at step 1214 in the form of an observation. Then, at step 1216 it is checked whether there is a conditional label advertisement error for the target prefix and if so at step 1218 this is reported. In the case that this is unavailable information then at step 1220 it is checked whether the label space is exhausted in which case a report is generated at step 1222. Otherwise a report is generated at step 1224 in the form of an observation setting out the various checks that have been carried out and indicating that the error cannot be identified.

In the case that label bindings were not received then, reverting to FIG. 4B, at step 430 LFIB entry data is collected and at step 432 a report is generated that the error cannot be determined. In that case any other observations and reports that have been collected will be presented to the administrator together with the collected LFIB entry data providing additional information allowing the administrator to identify other possible causes of the error.

In all cases, in addition to the report, a test log comprising an audit trail of the steps taken is available to the administrator to show what has taken place and an image of the actual network can be visually represented showing the relevant information including the routes part of the network, their IP addresses and other appropriate information such as access credentials. The test log can be attached to a "trouble ticket" which is forwarded on to the appropriate manager and shows the steps that have been completed and the conclusions reached. The provision of observations allows a distinction between diagnosable failures and issues that may cause a failure but cannot provide deterministic diagnosis such as ACL blocks and the various other steps described above. It will be seen that in addition to the various reports, further suggested actions can be recommended to correct the fault for example derivable from a database corresponding to the report messages generated. In particular the failure condition can be graphically represented including a summary field identifying in the type of problem encountered, a possible cause field identifying the precise nature of the problem and a recommended action field identifying what the operator should do to rectify the problem. Yet further the network management system can automatically, or under administrator control, effect a repair on a faulty node, based on the diagnosis.

It will be appreciated that the method described herein can be implemented in any appropriate manner. For example the standardized MPLS OAM capability in existing software can be implemented for example that capability in Cisco IOS software available from Cisco Systems, Inc of San Jose, USA and providing support for VRF ping and traceroute, LSP ping and traceroute and so forth Even where some routers in the MPLS network do not support LSP ping/traceroute functionality, diagnostics may still be possible in a network that consists of nodes that do not support OAM protocols being issued at the ingress of the path. For example such nodes may drop the OAM packets but further nodes downstream may replay and hence can be diagnosed.

In addition the mechanisms described in "MPLS OAM tools for troubleshooting MPLS Networks" and "Cisco MPLS Management Strategy" can be implemented as described in the respective documents and "cdccont_0900aecd80272b7f.pdf" in the directory "application/pdf/en/us/guest/netsol/ns172/c654" of the domain "Cisco.com" of the World Wide Web and "tech_brief0900aecd800f6e31.html" in the directory "en/US/tech/tk436/tk892" of the domain Cisco.com on the World Wide Web. In case where the network management system does not have the authority to modify the remote device configuration it may instead present the recommendation as a set of steps to be performed by the operator/administrator.

The Network management system can be implemented in any location and in any appropriate manner and logging onto remote diagnosable nodes can be carried out in any appropriate manner for example using the Telnet function as is well known to the skilled reader. It will further be appreciated that although discussion is generally directed to label switched paths in the above discussion, the path discovery, node identification, log in and troubleshoot steps described can be carried out in relation to fault diagnosis of any network path. For example end to end troubleshooting can be implemented for a network path between customer equipment points in which packet transport from customer equipment to provider edge is carried out using wide area network (WAN) technology and provider edges communicate via the MPLS protocol, or where parts of the communication path between equipment includes MPLS forwarding. However the method can also be implemented in relation to any other end-to-end path or path portions including pure IP paths.

Indeed it will be seen that the method may be implemented beyond the layer 3 services such as VPN and interne access described above in which the customer devices exchange layer 3 routing information with the service provider and packets are transported initially using layer 3 routing mechanisms and using other transport technologies such as MPLS where appropriate to help deliver packets. For example the method can be applied in relation to layer 2 services in which there is no exchange of layer 3 routing information with the service provider and packets are delivered using layer 2 technologies such as a asynchronous transfer mode (ATM), frame relay or pseudo wire. Whether the service is layer 2 or layer 3 based, the WAN technology can be for example a circuit based technology such as ATM or frame relay, or technologies such as Ethernet, point to point protocol or high-level data link control (HTLC). Where the service is layer 3 then an IP routing protocol may also run over the WA link, between the customer and provider edges as well as potentially an additional protocol running between the provider edges such as multi protocol border gateway protocol (MB-BGP).

The tests supplied effectively run from customer edge to customer edge or across appropriate parts of the path therebetween and the specific form of connectivity and path discovery tests for example ping and traceroute, are selected according to the path requirements.

Accordingly it will be recognized that the diagnosing node can be any appropriate network component dependent on the required technology. Similarly the diagnosable node can be any appropriate network component such as a router, bridge or switch. Generally the diagnosable node is a network device that processes traffic using any layers of the OSI model. For example, At layer 1 it might be a Wave Division Multiplexer or repeater. At Layer 2 it might be a bridge or a switch and at Layer 3 it might be a router. More recent advancements, such as Application Oriented Networking (from Cisco Systems)

allow decisions to be made at the application level, by inspecting the full message, not just the headers.

Generally it will be seen that the mechanisms by which the method and optimizations discussed above are implemented it will be well known to the skilled reader and do not require detailed discussion here. Additional steps can be implemented in hardware, software or firmware as appropriate.

4.0 Implementation Mechanisms—Hardware Overview

Figure 13:
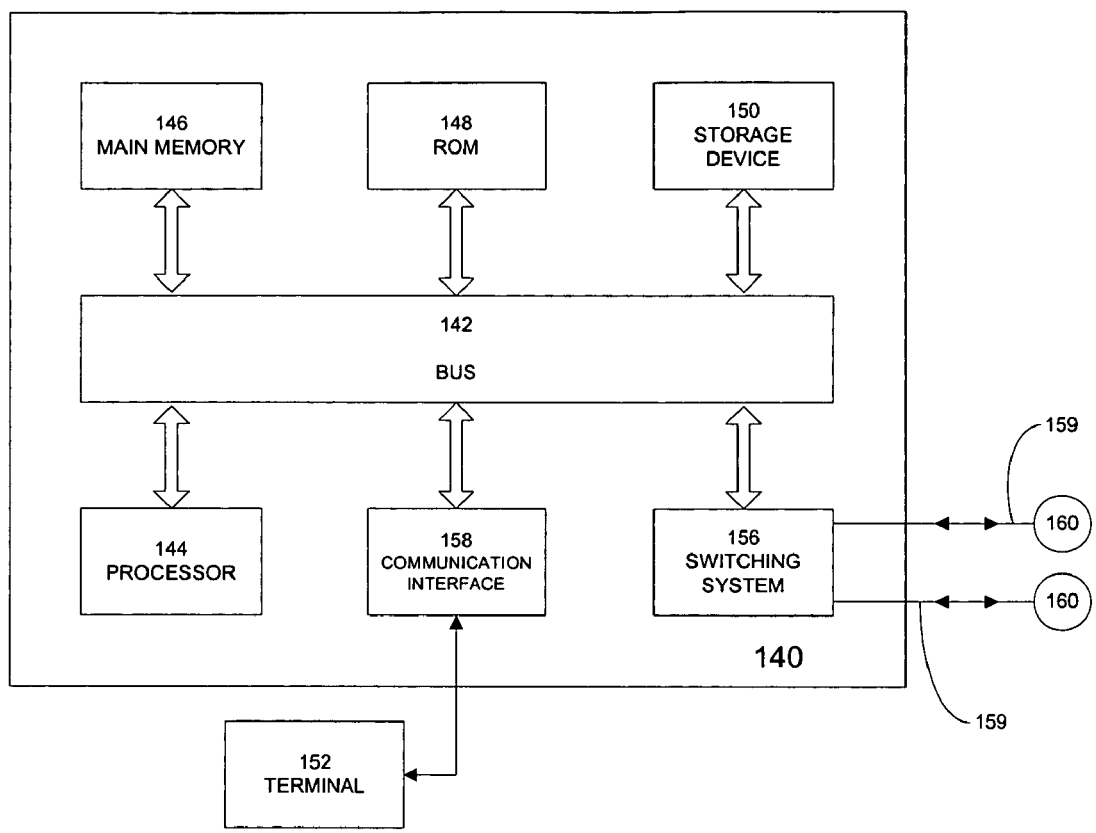
FIG. 13 is a block diagram that illustrates a computer system upon which a method for forwarding data may be implemented.

FIG. 13 is a block diagram that illustrates a computer system 40 upon which the method may be implemented. The method is implemented using one or more computer programs running on a network element such as a router device. Thus, in this embodiment, the computer system 140 is a router.

Computer system 140 includes a bus 142 or other communication mechanism for communicating information, and a processor 144 coupled with bus 142 for processing information. Computer system 140 also includes a main memory 146, such as a random access memory (RAM), flash memory, or other dynamic storage device, coupled to bus 142 for storing information and instructions to be executed by processor 144. Main memory 146 may also be used for storing temporary variables or other intermediate information during execution of instructions to be executed by processor 144. Computer system 140 further includes a read only memory (ROM) 148 or other static storage device coupled to bus 142 for storing static information and instructions for processor 144. A storage device 150, such as a magnetic disk, flash memory or optical disk, is provided and coupled to bus 142 for storing information and instructions.

A communication interface 158 may be coupled to bus 142 for communicating information and command selections to processor 144. Interface 158 is a conventional serial interface such as an RS-232 or RS-422 interface. An external terminal 152 or other computer system connects to the computer system 140 and provides commands to it using the interface 158. Firmware or software running in the computer system 140 provides a terminal interface or character-based command interface so that external commands can be given to the computer system.

A switching system 156 is coupled to bus 142 and has an input interface and a respective output interface (commonly designated 159) to external network elements. The external network elements may include a plurality of additional routers 160 or a local network coupled to one or more hosts or routers, or a global network such as the Internet having one or more servers. The switching system 156 switches information traffic arriving on the input interface to output interface 159 according to pre-determined protocols and conventions that are well known. For example, switching system 156, in cooperation with processor 144, can determine a destination of a packet of data arriving on the input interface and send it to the correct destination using the output interface. The destinations may include a host, server, other end stations, or other routing and switching devices in a local network or Internet.

The computer system 140 implements as a network management or diagnosable node the above described method of forwarding data. The implementation is provided by computer system 140 in response to processor 144 executing one or more sequences of one or more instructions contained in main memory 146. Such instructions may be read into main memory 146 from another computer-readable medium, such as storage device 150. Execution of the sequences of instructions contained in main memory 146 causes processor 144 to perform the process steps described herein. One or more processors in a multi-processing arrangement may also be employed to execute the sequences of instructions contained in main memory 146. In alternative embodiments, hard-wired circuitry may be used in place of or in combination with software instructions to implement the method. Thus, embodiments are not limited to any specific combination of hardware circuitry and software.

The term "computer-readable medium" as used herein refers to any medium that participates in providing instructions to processor 144 for execution. Such a medium may take many forms, including but not limited to, non-volatile media, volatile media, and transmission media. Non-volatile media includes, for example, optical or magnetic disks, such as storage device 150. Volatile media includes dynamic memory, such as main memory 146. Transmission media includes coaxial cables, copper wire and fiber optics, including the wires that comprise bus 142. Transmission media can also take the form of wireless links such as acoustic or electromagnetic waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 144 for execution. For example, the instructions may initially be carried on a magnetic disk of a remote computer. The remote computer can load the instructions into its dynamic memory and send the instructions over a telephone line using a modem. A modem local to computer system 140 can receive the data on the telephone line and use an infrared transmitter to convert the data to an infrared signal. An infrared detector coupled to bus 142 can receive the data carried in the infrared signal and place the data on bus 142. Bus 142 carries the data to main memory 146, from which processor 144 retrieves and executes the instructions. The instructions received by main memory 146 may optionally be stored on storage device 150 either before or after execution by processor 144.

Interface 159 also provides a two-way data communication coupling to a network link that is connected to a local network. For example, the interface 159 may be an integrated services digital network (ISDN) card or a modem to provide a data communication connection to a corresponding type of telephone line. As another example, the interface 159 may be a local area network (LAN) card to provide a data communication connection to a compatible LAN. Wireless links may also be implemented. In any such implementation, the interface 159 sends and receives electrical, electromagnetic or optical signals that carry digital data streams representing various types of information.

The network link typically provides data communication through one or more networks to other data devices. For example, the network link may provide a connection through a local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the interface 159, which carry the digital data to and from computer system 140, are exemplary forms of carrier waves transporting the information.

Computer system 140 can send messages and receive data, including program code, through the network(s), network link and interface 159. In the Internet example, a server might transmit a requested code for an application program through the Internet, ISP, local network and communication interface 158. One such downloaded application provides for the method as described herein.

The received code may be executed by processor 144 as it is received, and/or stored in storage device 150, or other non-volatile storage for later execution. In this manner, computer system 140 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The method steps set out can be carried out in any appropriate order and aspects from the examples and embodiments described juxtaposed or interchanged as appropriate. It would be appreciated that the approach can be adopted in respect of any MPLS network including but not limited to MPLS VPN either at the service provider or enterprise network level. The approach can be used in addition to troubleshooting for post provision in connectivity checks or VPN connections which can reduce the cost of provisioning significantly. The approaches can be implemented in relation to any appropriate label switching protocol including LDP and tag distribution protocol (TDP).

What is claimed is:

1. A method of diagnosing a fault in a Multi Protocol Label Switching (MPLS) network path comprising the steps, performed at a diagnosing node, of:
    initiating a path discovery test to a destination node;
    receiving at least one path discovery test response;
    identifying a diagnosable node on the MPLS network path from the path discovery test response;
    remotely accessing said diagnosable node; and
 performing a diagnostic routine, using a layer two service of the Open System Interconnection (OSI) reference model, at said diagnosable node to at least determine whether an MPLS packet handled by said diagnosable node carried an incorrect header; wherein the layer two service does not have information about an exchange of layer three routing information with a service provider;
    in response to the diagnostic routine not diagnosing the fault at the diagnosable node, using the layer two service of the OSI reference model, the diagnosable node, from forwarding information at the diagnosable node, without sending a test packet, identifying a next-hop node along the MPLS network path to the destination node, and using the layer two service of the OSI reference model, remotely accessing the next-hop node along the MPLS network path to the destination node as a new diagnosable node and performing the diagnostic routine at said new diagnosable node; wherein the method is performed by one or more computing devices; wherein the method is performed in a-the layer two service of the OSI reference model.

2. A method as claimed in claim 1 further comprising, initiating a connectivity test prior to said path discovery test, and initiating said path discovery test if the connectivity fails.

3. A method as claimed in claim 1 in which the MPLS network path is an MPLS label switched path.

4. A method as claimed in claim 3 in which the label switched path is contained within a VPN.

5. A method as claimed in claim 3 in which the diagnostic routine includes at least one of identification of operator misconfiguration, identification of the failure of label distribution protocol, identification of a route installation problem, a label switch path black hole, a label switch path return path failure, label distribution protocol session failure; label allocation failure; route target mismatch; or router line card failure.

6. A method as claimed in claim 1 further comprising displaying a diagnosis report.

7. A method as claimed in claim 6 in which the report comprises an observation identifying the MPLS network path and node characteristics.

8. A method as claimed in claim 6 further comprising displaying a log of diagnostic routine steps performed.

9. A method as claimed in claim 6 further comprising implementing a recommended fault correction action.

10. A method as claimed in claim 1 in which the diagnosing node comprises a network management system.

11. A method as claimed in claim 1 in which the path discovery test comprises one of a traceroute command or a PVP path trace.

12. A method as claimed in claim 1 in which the path discovery test is initiated at an ingress node of the MPLS network path.

13. A method as claimed in claim 1 in which the path discovery test is initiated at a network path image accessible at the diagnosing node.

14. A method as claimed in claim 1 in which the diagnosable node is identified as one of the furthest downstream node in the MPLS network path sending a path discovery test response or a node on the MPLS network path sending a fault path discovery test response.

15. A method as claimed in claim 1 further comprising initiating a path discovery test at each end node of the MPLS network path.

16. A method as claimed in claim 1 in which the path discovery test response includes a diagnosable node identifier, and the corresponding diagnosable node is identified at the diagnosing node from identification information accessible by the diagnosing node.

17. A method as claimed in claim 16 in which diagnosable node remote access data is obtained at the diagnosable node from information accessible by the diagnosable node.

18. A method as claimed in claim 1 performed in response to a notified connectivity change.

19. A method as claimed in claim 1 in which the diagnosable node comprises at least one of a router, a bridge or a switch.

20. A method as claimed in claim 1 in which the step of remotely accessing the diagnosable node comprises logging onto the diagnosable node.

21. A method of claim 1, wherein the identifying the diagnosable node on the MPLS network path from the path discovery test response comprises identifying the diagnosable node as either a last healthy node or a first node that returned an unhealthy response.

22. A computer readable volatile or non-volatile storage medium storing one or more sequences of instructions for diagnosing a fault in a Multi Protocol Label Switching (MPLS) network path which, when executed by one or more processors, cause the one or more processors to perform the steps of:
- initiating a path discovery test to a destination node;
- receiving at least one path discovery test response;
- identifying a diagnosable node on the MPLS network path from the path discovery test response;
- remotely accessing said diagnosable node; and performing a diagnostic routine, using a layer two service of the Open System Interconnection (OSI) reference model, at said diagnosable node to at least determine whether an MPLS packet handled by said diagnosable node carried an incorrect header;
- wherein the layer two service does not have information about an exchange of layer three routing information with a service provider, in response to the diagnostic routine not diagnosing the fault at the diagnosable node, using the layer two service of the OSI reference model, the diagnosable node, from forwarding information at the diagnosable node, without sending a test packet, identifying a next-hop node along the MPLS network path to the destination node, and using the layer two service of the OSI reference model, remotely accessing the next-hop node along the MPLS network path to the destination node as a new diagnosable node and performing the diagnostic routine at said new diagnosable node; wherein the steps are performed in a-the layer two service of the OSI reference model.

23. A computer readable volatile or non-volatile storage medium of claim 22, wherein the identifying the diagnosable node on the MPLS network path from the path discovery test response comprises identifying the diagnosable node as either a last healthy node or a first node that returned an unhealthy response.

24. An apparatus for diagnosing a fault in a Multi Protocol Label Switching (MPLS) network path comprising:
- one or more processors;
- a network interface communicatively coupled to the one or more processors and configured to communicate one or more packet flows among the one or more processors in a network;

and
- a computer readable volatile or non-volatile storage medium storing one or more sequences of instructions for diagnosing a fault in the MPLS network path which, when executed by the one or more processors, cause the one or more processors to perform:
- initiating a path discovery test to a destination node;
- receiving at least one path discovery test response;
- identifying a diagnosable node on the MPLS network path from the path discovery test response;
- remotely accessing said diagnosable node; and
- performing a diagnostic routine, using a layer two service of the Open System Interconnection (OSI) reference model, at said diagnosable node to at least determine whether a-an MPLS packet handled by said diagnosable node carried an incorrect header;
- wherein the layer two service does not have information about an exchange of layer three routing information with a service provider,
- in response to the diagnostic routine not diagnosing the fault at the diagnosable node, using the layer two service of the OSI reference model, the diagnosable node, from forwarding information at the diagnosable node, without sending a test packet, identifying a next-hop node along the MPLS network path to the destination node, and using the layer two service of the OSI reference model, remotely accessing the next-hop node along the MPLS network path to the destination node as a new diagnosable node and performing the diagnostic routine at said new diagnosable node;
- wherein the diagnostic routine is performed in a-the layer two service of the Open OSI reference model.

25. An apparatus of claim 24, wherein the identifying the diagnosable node on the MPLS network path from the path discovery test response comprises identifying the diagnosable node as either a last healthy node or a first node that returned an unhealthy response.

* * * * *

UNITED STATES PATENT AND TRADEMARK OFFICE
CERTIFICATE OF CORRECTION

| | | |
|---|---|---|
| PATENT NO. | : 7,983,174 B1 | Page 1 of 1 |
| APPLICATION NO. | : 11/313283 | |
| DATED | : July 19, 2011 | |
| INVENTOR(S) | : John Monaghan et al. | |

It is certified that error appears in the above-identified patent and that said Letters Patent is hereby corrected as shown below:

In the claims:

Column 15, claim 1, line 66, After "a" delete "the"

Column 17, claim 22, line 27, After "a" delete "the"

Signed and Sealed this
Twentieth Day of September, 2011

David J. Kappos
*Director of the United States Patent and Trademark Office*